Jan. 2, 1962   W. H. COULTER ET AL   3,015,775
FLUID METERING SYSTEM AND APPARATUS
Filed Jan. 9, 1959   2 Sheets-Sheet 1
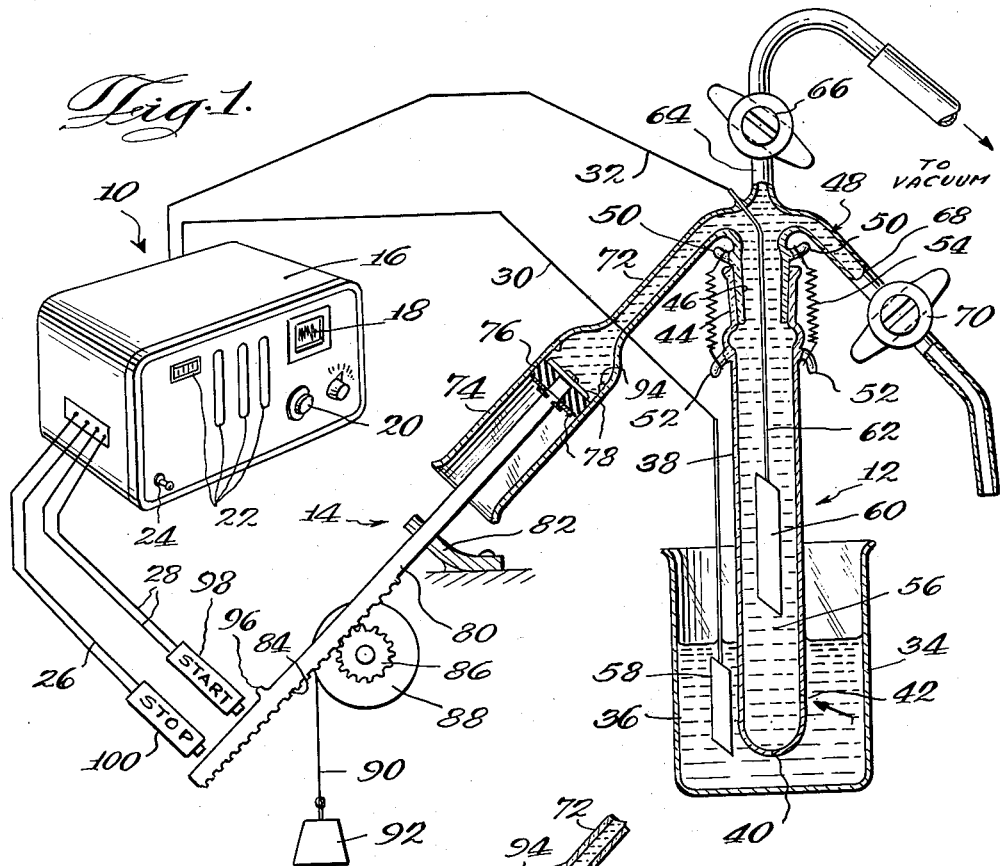
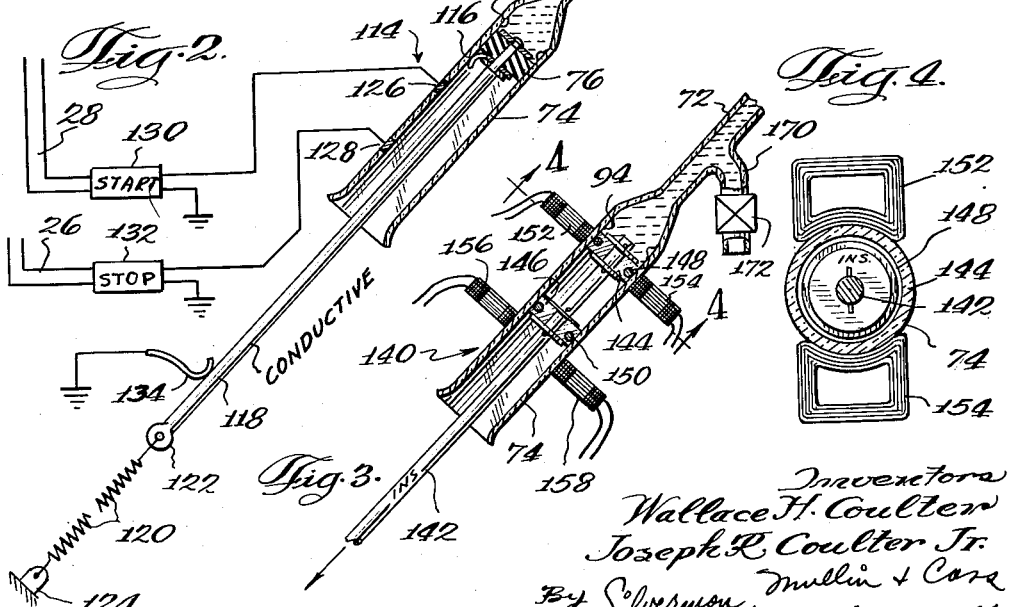
Inventors
Wallace H. Coulter
Joseph R. Coulter Jr.
By Silverman, Mullin & Cass
attorneys

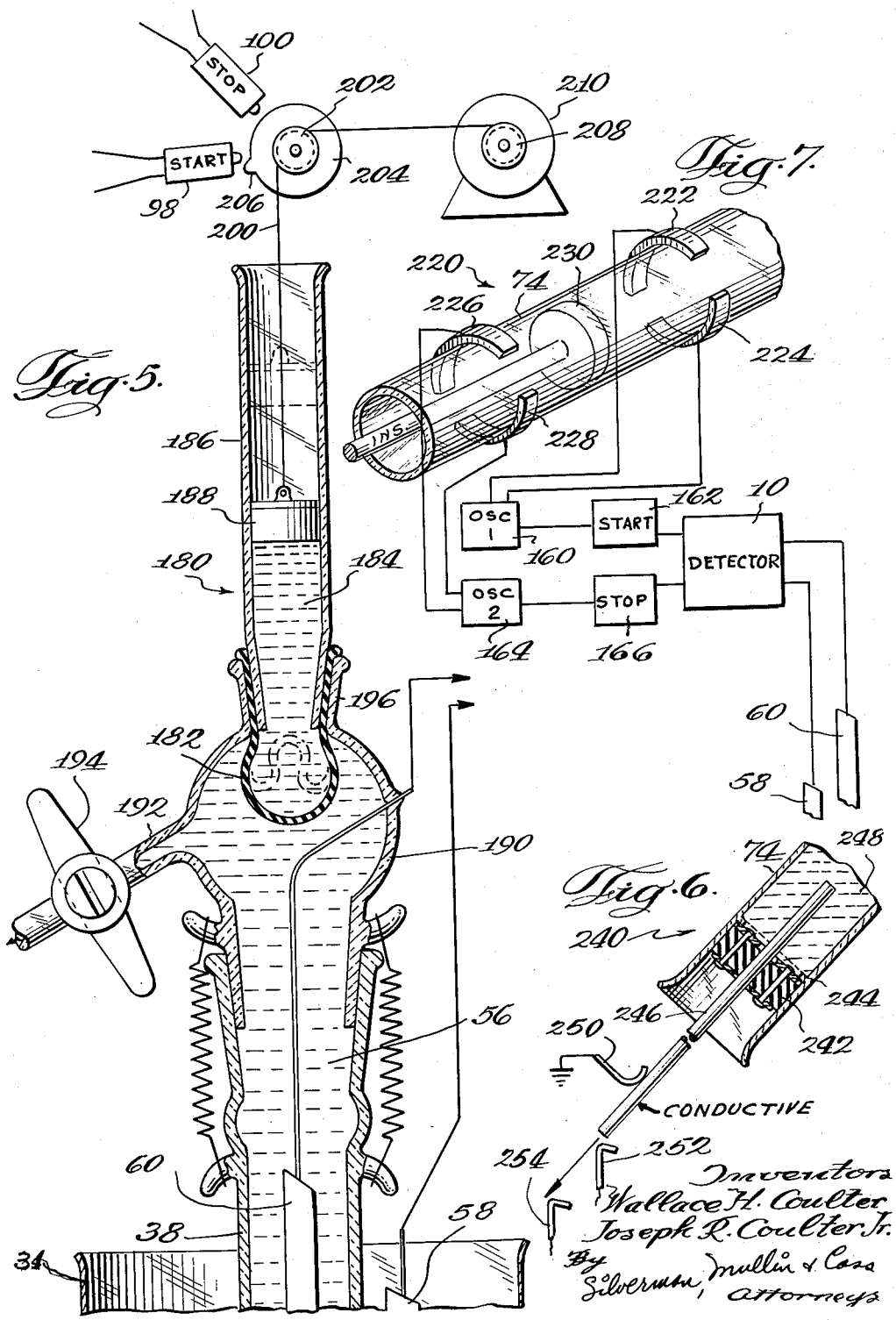

3,015,775
Patented Jan. 2, 1962

1

3,015,775
FLUID METERING SYSTEM AND APPARATUS
Wallace H. Coulter, Chicago, and Joseph R. Coulter, Jr., Roselle, Ill., assignors to Coulter Electronics, Inc., Chicago, Ill., a corporation of Illinois
Filed Jan. 9, 1959, Ser. No. 785,931
17 Claims. (Cl. 324—71)

This invention relates generally to fluid metering systems and apparatus therefor and, more particularly, is concerned with a system and apparatus which are used to study the number, size, distribution and other characteristics of particles suspended in a fluid.

This application is a continuation-in-part of our copending application Serial No. 583,850, filed May 9, 1956 and entitled "Fluid Metering Apparatus," now Patent No. 2,869,078. The system and apparatus are concerned with a novel structure in which a fluid such as that containing a suspension of particles under study is passed through an orifice which may be microscopic in dimensions. The orifice may have a constant potential across the same, or a constant current may be arranged to pass through the fluid within the orifice. The nature of the fluid and the electrical character of the particles is such as to change the electrical effect of the orifice contents each time that a particle passes through the same. Thus, the change in impedance of the orifice would change the potential across the orifice or the current through the same, which is readily detectable.

The bodies of fluid on opposite sides of the orifice are subjected to different pressures, such as, for example, by establishing a head between them or by applying pressure or suction to one body or the other by conventional means. This causes the flow of fluid through the orifice carrying such particles as are in suspension in the fluid. The fluid is ordinarily an electrolyte and the vessels which are used are of insulating material. The particles are usually of different conductivity than the electrolyte, and hence, when a particle passes into the orifice, it displaces a volume of electrolyte that is equal to its own volume and substitutes the effective impedance of itself for that of the displaced fluid.

The change in resistance is translated into a voltage pulse through suitable electronic circuitry, the duration of which is related to the time for the particle to pass through the orifice, the frequency of occurrence of which is related to the rate at which the particles are passing through the orifice, and the amplitude of which is related to the size of the particle.

Obviously, other electrical methods may be used with this system, such as, for example, using radio frequency potential across the orifice and measuring the change in the output caused by the change in dielectric properties caused by passage of a particle.

In U.S. Patent No. 2,656,508, there is illustrated and described a successful and highly efficient system with which the apparatus of the said co-pending application and that of this application are preferably used. Reference may be made to that patent for the details of the principles which are involved in said system.

In the said co-pending application, the structure which is illustrated and described comprises a manometer and syphon arrangement in which there was provided a mercury column in a conduit which was connected with the inner one of two vessels arranged one within the other. The said inner vessel was completely filled with the fluid being metered or the electrolyte in which the particles were suspended, and it was provided with a fine aperture or orifice that was immersed in a second vessel containing a similar fluid or electrolyte with particles suspended therein. The inner vessel was also connected with a source of vacuum. The vacuum was applied to said

2 inner vessel as a result of which the column of mercury rose in one side of the manometric tube to some selected level which brought the mercury out of engagement with a pair of contacts in a metering branch of the manometric column. The orifice in the inner vessel is usually small compared to the diameter of the mercury column, so that the effect of influx of fluid from the second vessel during this initial period is not substantial, but, in any event, such influx is unimportant during the initial period.

Thereafter, the external vacuum is disconnected from the system. Now, the column of mercury commences to drop due to gravity, and in so doing, it applies a syphoning effect upon the inner vessel fluid, drawing the suspension from the second vessel through the orifice or aperture. An electrode in each of the vessels connects to an electrical detecting device which is adapted to produce a voltage pulse each time a particle passes through the orifice. The counter circuit of the detector, however, is rendered inoperative by suitable electrical means which is controlled by switches or the like operating in conjunction with the metering section of the manometric column. The mercury column has one ground electrode which is always in contact therewith, and as the column moves into the metering section, the mercury first completes a "start" circuit which renders the counter circuit of the detector active so that the passage of particles produces pulses in the detector. These pulses are counted and may also be viewed on a cathode ray oscilloscope. After the mercury column has traversed a predetermined volume of the metering section, and consequently has drawn that same volume of the suspension into the inner vessel, the mercury column engages a second contact which completes a "stop" circuit to deactivate the counter circuit.

Thus, the entire apparatus is set into operation by merely applying vacuum to the inner vessel and then releasing it, that is, establishing a pressure differential between vessels. Obviously, the electrical circuitry must be properly energized and connected with suitable power sources. The orifice comprises part of a scanner element in which the fluid is caused to move past the scanner element. A variation of the impedance across the scanner element is an indication of the passage of a particle, and the volume or size thereof.

This invention is primarily concerned with novel changes in the metering and scanning system, in that the speed of scanning may be increased, the mercury manometer and the need for handling such materials are eliminated, and the apparatus may be rendered simple and less complex. The objects of the invention are concerned with the provision of such improvements.

Other important objects of the invention are the provision of novel means for simplifying the construction of the glassware of the apparatus; novel means for activating and deactivating the input circuit of the detector; novel means for rendering the metering of the fluid and the scanning of the particles faster and more accurate than through the use of manometric and syphon tubes using mercury.

Still a further object of the invention is concerned with the use of means to meter the fluid without causing contact between the electrolyte and the metering device.

As the description of the invention proceeds it will become apparent that the advantages and benefits of the co-pending application of which this comprises a continuation-in-part have been retained, and hence, the objects of that application are included as part of the objects of this invention. As examples of these, this invention also enables the high degree of repeatability which is possible with the invention of the co-pending system; provides great accuracy; minimizes the effects of variations in fluid pressure due to bubbles and flexible glassware connections; and the like.

The invention described and claimed in said co-pending application is equally applicable to the metering of fluid in small quantities for purposes of particle or fluid study in systems other than described in said Patent 2,656,508, such as optical and photo-electric scanning systems. That is also true of this invention, although the primary purpose for which the invention herein is intended is the metering of precise quantities of fluid having particles suspended therein and the scanning of the fluid for detection of said particles, all in accordance with the teachings of the said Patent 2,656,508. It should, therefore, be borne in mind that the scope of the invention herein extends to variations and departures from the structures shown and described hereinafter as preferred embodiments.

In the drawings:

FIG. 1 is a schematic view showing the general circuitry of a complete system constructed and operated in accordance with the teachings of the said Patent 2,656,508, and having the invention hereof associated therewith. Portions of the view which comprise the glassware and metering apparatus are shown in section.

FIG. 2 is a sectional view of a portion of a system similar to that of FIG. 1 illustrating a modified form of the metering structure of the invention.

FIG. 3 is a view similar to that of FIG. 2 but of still another modified form of the invention.

FIG. 4 is a sectional view taken through the structure of FIG. 3 along the line 4—4 and in the indicated direction.

FIG. 5 is a fragmentary median sectional view through another modified form of the invention, with diagrammatic representation of portions of the over-all system which are involved therewith.

FIG. 6 is a fragmentary sectional view of still another modified form of the invention.

FIG. 7 is a fragmentary perspective elevational view of another modified form of the invention with a block diagram of a system with which the same may be used, this system also being applicable generally to the form of the invention illustrated in FIGS. 3 and 4.

Generally, the invention may be understood through a study of said co-pending application in order that the principles thereof need not be repeated here in detail. As described therein, the primary purpose of the metering system and apparatus is the metering of a predetermined volume of the fluid or suspension past a scanning element of a detection system at a substantially constant rate and hence, at a constant pressure. These factors are, however, not necessarily limitations of the invention. In the first place, during the metering process, a piece of debris may become lodged in the orifice, thereby changing the effective rate of flow, but if the metering continues, eventually the metering device will cause a correct volume of fluid to flow, and hence, the count will not be changed materially. Such an eventuality would obviously affect orifice size and hence, the sensitivity which would upset size distribution measurements. In the second place, the precise volume is not required in size distribution determinations, and the metering device is not essential for that process, although means for producing the pressure differential between vessels is required, and the invention herein provides this.

The apparatus of the co-pending application is connected to an external source of vacuum which is used to unbalance a portion of the metering system in order to establish a fluid pressure differential between the vessels. When the external source of vacuum is disconnected from the system, the fluid pressure differential will cause the flow of fluid between the vessels through the orifice or aperture. The differential pressure was achieved by the unbalancing of a mercury column in a manometer.

This invention is characterized by the use of considerably different means to achieve the flow of fluid from one vessel to another through the orifice. The application of vacuum to one vessel of a pair which are connected together by the orifice, and not necessarily one within the other, raises a plunger or piston in a tubular member, much like the reciprocatory piston in a cylinder of a fluid motor. This plunger is in fluid pressure engagement with the fluid in said one vessel, either directly in contact therewith or through a flexible diaphragm or membrane. The plunger is biased to move in a direction which will tend to withdraw fluid from said one vessel because the tubular member within which the plunger reciprocates is fluidly connected with said vessel and this movement will cause flow of the fluid from the other vessel through said orifice.

Instead of using vacuum applied to one vessel, pressure may be applied to the other vessel to cause the flow. Likewise, the establishment of fluid pressure differential between the vessels may be effected by manual movement of the plunger to "cock" the system for operation, the vessel connected with the plunger being provided with means to discharge the fluid during this cocking movement to enable the cocking to occur speedily, and to prevent the expelling of large quantities of fluid in the said vessel through the orifice in a direction opposite to the flow during operation of the system.

To effect the scanning which is required when the passage of particles is to modulate the potential which exists across the orifice or aperture, suitable electrodes are immersed in the respective vessels, and connected to the detector device. The detector is turned on and off by means energized by the movement of the piston, or movement of the rod or member which is connected to move the piston, by movement of a mechanical part or parts of the mechanism through which the piston is withdrawn, or in some other manner. The piston or plunger is biased, as stated, to move out of the tubular member, and the means which accomplish this movement may be weights, springs, or constant speed driving means such as synchronous electric motors.

The piston or plunger or portion of the apparatus connected therewith through which the metering occurs is so calibrated that the length of the piston stroke may be related to the volume of fluid which is drawn into the inner vessel through the orifice. Thus, the volume which is displaced between the turning on and turning off of the detector can be established with accurate repeatability in terms of piston or plunger stroke.

Referring now to the specific details, the drawings illustrate several embodiments of the invention, the first of which will be described in connection with FIG. 1. Prior to entering upon such description, it is important to realize that the structure and apparatus illustrated in FIG. 1 and in the other figures as well include diagrammatic representations of articles which are understood without additional detail. The connection of wires, the arrangement of the glassware, the sizes and shapes of certain parts, and many other things are fully disclosed and understood by those skilled in this art through representation by conventional or accepted symbols and the like. For example, wheels and gears must be suitably journalled and mounted to eliminate friction, means must be provided to eliminate slip between cords or other flexible members and sheaves or wheels with which the same engage, electrical joints must be suitably made with terminals that are insulated and/or shielded as needed, etc.

In FIG. 1, the apparatus may be divided generally into three parts, namely the detector 10, the scanning apparatus 12 and the metering means 14. These three portions of the apparatus are not necessarily independent of one another, but are separated as mentioned for the purpose of locating parts and functions in connection with the explanation of the invention.

The detector 10 is shown housed in a suitable cabinet 16 and is provided with the electronic circuitry for detection, measurement, counting and the other functions that it is desired be done electrically by the system. For example, it may have a cathode ray display tube 18 upon which pulses representing the passage of particles may be displayed, measured, and discriminated from one another. This latter function, for example, could be done by threshold adjusting networks operated by suitable controls 20 provided on the face of the cabinet 16. The counting circuit or circuits may operate in conjunction with mechanical and/or electronic display devices such as shown at 22. Power switches such as at 24 may provide connection to power sources (not shown). The various parts of the system are connected to the detector through suitable cables or wires and the like, such as for example, the four wires 26 and 28 connected with the metering device 14, and the two wires 30 and 32 connected with the scanning apparatus 12.

The scanning apparatus 12 illustrated is not substantially different from that illustrated in said co-pending application Serial No. 583,850 (exclusive of that portion which is connected with the metering device 14). The outer vessel 34 may be a simple beaker of glass or other material which is compatible with the body of the fluid electrolyte 36 which it carries. Disposed in the fluid body 36 is a tubular member 38, the bottom end 40 of which is closed off but for a microscopic orifice or aperture 42 provided in the side thereof spaced above the closed off end. The tubular member 38 is a part of a closed fluid system and for that purpose is therefore provided at its upper end with a tapered mouth 44 into which there is engaged the matingly tapered tubular extension 46 of a multi-branched member 48. The tubular member 38 and the multi-branched member 48 have horns or hook-like projections 50 and 52 between which there are tension members such as springs 54 to hold the parts of the scanning device 12 assembled in fluid tight relationship.

The actual scanning element of the device 12 comprises the orifice 42 since the potential which is modulated is applied across the orifice. The entire interior of the multi-branched member 48 and the tubular member 38 is filled with another body of fluid 56 which is usually the same as the body of fluid 36, although in using the apparatus, since the flow of the suspension is uni-directional through the orifice, consecutive accurate determinations can be made of different samples. Platinum electrodes 58 and 60 are immersed in the fluid and connected by suitable platinum wires to the conductors 30 and 32. Note that the wire 62 is led through the wall of the member 48.

The branch 64 of the member 48 is connected through a stopcock 66 to a suitable vacuum source for the purpose of establishing the pressure differential described above. The branch 68 has a stopcock 70 and this is a convenient means of flushing the interior of the system or quickly filling the same with a sample. Its operation is obvious.

The important portion of the structure is that connected with the branch 72. This is the metering device 14. The branch 72 may be any suitable diameter of tubing and conveniently may be of a capillary or near capillary nature. This is all a matter of determining what the requirements of the system are and the size of the orifice as well as the speed it is desired to scan and meter the fluid.

The branch 72 connects with a tubular portion 74 which has a reciprocable plunger 76 mounted therein in substantially fluid tight connection. The plunger 76 may comprise a disc of some relatively resilient material such as rubber or synthetic rubbers where the nature of the fluid permits, or synthetic resins. Tetrafluorethylene, for example, may be used. The plunger 76 may be mounted through the use of suitable compression washers 78 on a relatively rigid connecting rod 80 which passes through a guide 82 and has a rack 84 formed thereon engaged with the pinion 86. The pinion is coaxial and rotates with a wheel 88 which has a cord or other flexible member 90 secured to the same. A weight 92 is suspended from the wheel 88 by means of the cord 90, and since the cord is secured at a point, preferably on the periphery, but in any event eccentric relative the wheel axis, the weight 90 tends to bias the wheel 88 to rotate counter-clockwise, driving the pinion also in that direction, and in turn withdrawing the rod 80 and plunger 76 downward and to the left.

The angular disposition of the cylindrical portion 74 is such that there is little likelihood of bubbles being trapped therein, the bubbles rising to the top of the multi-branched member 48 from whence they may be withdrawn by vacuum or by any outlet opened as desired. When vacuum is applied, the plunger 76 will be drawn into the interior of the tubular portion 74 upward and to the right, until its movement is stopped by means of the stop projections 94 formed on the interior of the tubular portion 74. Any other suitable stop means may be used, or none, if desired, the operator in this latter case watching the rise of the plunger until it reaches a predetermined level. This level may be marked on the side wall of the portion 74, or may be measured by the movement of the rod 80 or the rise of the weight 92 or the revolutions of the wheel 88.

This, of course, will raise the weight 92 and pull the projection 96 provided on the rod 80 past the start and stop switches 98 and 100. After the stopcock 66 has been turned to "off" position, the only pressure which is applied to the body of fluid 56 is a negative pressure in comparison to the pressure applied to the liquid exposed to the atmosphere, because the weight 92 tries to drop. In other words, the displacement of the plunger 76 downward and to the left through the lowering of the weight 92 causes a difference in pressure between the bodies of fluid on opposite sides of the orifice 42 and the fluid or electrolyte from the beaker 34 will pass into the tubular member 38 through the orifice 42. Each time that a particle enters and passes through the said orifice it will be detected by the detecting device 10, providing the detecting device 10 has been readied to accept the signals.

The detector 10 is normally quiescent, with its input circuit deactivated. The only time that it will accept signals is after the projection 96 has engaged the button of the start switch 98, and from that point of time until the projection has engaged the button of the stop switch 100. Of course, any suitable switching means can be used in place of 98 and 100, and such means may be operated by buttons, levers, contacts, springs and the like. In addition, the cathode ray display circuit may be operative at all times.

The adjustment of the positions of the switches 98 and 100 will control the length of movement of the plunger which delineates the detecting period, and since plunger movement is the equivalent of fluid displacement within the interior of the system in the body of fluid 56, the switches 98 and 100 may be adjusted to meter any desired volume of fluid from the body 36 to the body 56 depending upon the dimension limitations of the apparatus and its parts.

It will be seen that this is a relatively simple structure insofar as metering is concerned and that the structure avoids the need for manometers, the handling of mercury and the like. Also, if debris is lodged in the orifice 42, instead of turning on the vacuum, or mechanically attempting to dislodge the same, the plunger rod 80 need be moved upwardly slightly exerting pressure on the orifice 42 instead of suction. The plunger operated metering device is especially suitable for metering very small volumes of fluid, and this will be emphasized especially in connection with the embodiment of FIG. 6, described hereinafter.

The metering device 114 which is illustrated in FIG. 2 differs primarily from the metering device 14 in that the plunger 76, which may be substantially identical in construction to that of the structure 14, has an electrical contact 116 secured thereto and connected electrically to the conductive connecting rod 118. Biased movement of the rod is achieved by means of a spring 120 connected to the rod end 122 and secured to some fixed point 124 so that the weights and wheels of FIG. 1 are eliminated. The switching which was accomplished in the metering device 14 is directly effected in this structure by means of the metallic contacts 126 and 128 which connect respectively with start and stop devices 130 and 132 and are exposed to the inside of the tubular member 74 so that the movement of the rod 118 will carry the contact 116 first into engagement with the contact 126 and thereafter into engagement with the contact 128. The rod 118 may have a grounded wiper 134 by means of which the circuits with the start and stop devices are consecutively completed.

The start and stop devices 130 and 132 may comprise any suitable control means such as circuit-closing relays, but may merely signify direct connections from the contacts 126 and 128 and ground through contact 134 with the leads 28 and 26, thus operating suitable enabling circuits within the detector. These structures are readily understood by the artisan.

In the metering device 140 several unusual and advantageous structural features are illustrated. The tubular member 74 connected in branch 72 is substantially the same as that of FIG. 1, having the stop means 94. Instead of having a conducting connecting rod, the rod 142 is of insulating material, and it carries one or two plungers or pistons, two being shown at 144 and 146. Each plunger is made of suitable resilient material to effect a seal within the tubular member 74, but each has a single loop of wire embedded therein close to the outer periphery of said plunger. The loops are designated 148 and 150. On opposite sides of the tubular member 74 there are provided coils of wire, there being two pairs, one pair 152 and 154 being at the right and the other pair 156 and 158 being at the left. The pairs of coils are spaced along the length of the tubular member 74 a greater distance than the distance between plungers 144 and 146.

The pairs of coils are each connected to some form of electrical circuit which will have its character changed if the coupling between the coils of the pair is changed. Thus, for example, if the coils 152 and 154 are connected respectively in the plate and grid circuits of a tuned-grid, tuned-plate oscillator whose output operates into a relay circuit, and if the coupling between the plate and grid circuits is insufficient to cause oscillation but can be rendered so by means of the positioning of the loop of wire 148 between the coils 152 and 154, the oscillator will commence oscillation, and can operate the relay circuit to start the operation of the detector. This is illustrated in FIG. 7 in connection with a modified form of circuit using changes in capacitive coupling.

The coils 152 and 154 would both be connected to the first oscillator 160 which in turn is connected to the start device 162 which connects in turn to the detector 10. The oscillator 160 may be either set into oscillation or stopped from oscillating when the loop of wire 148 is aligned between coils 152 and 154.

If there were a single plunger 144, the movement of the rod 142 during the scanning interval would carry the same loop 148 to an aligned disposition between the coils 156 and 158 which may also be connected to an oscillator such as the second oscillator 164 which is intended to drive the stop device 166. This movement requires the displacement of considerable volume, and the displacement may be decreased by reason of the use of a second plunger 146 with an identical loop 150. The increased spacing of the pairs of coils also lends to greater stability of the respective oscillators through decrease of field interference between the respective pairs of coils.

In FIG. 3, a further modification of the meeting device is illustrated. Instead of having a direct connection of the branch 72 to the multi-branched member 48, there is a lateral relief branch 170 in which there is disposed a unilateral valve or a stopcock, either being intended by the symbol 172. Thus, instead of requiring an external source of vacuum, which can be eliminated, the plungers may be cocked merely by pushing them into the tubular member 74 in the case a unilateral valve is used at 172, or if a stopcock is used at 172, opening the same and pushing the rod 142 inward, then closing the same. This process will relieve sufficient fluid from the system to enable the plunger to be moved, after which the bias will commence to move the plunger downward. The use of the relief branch 170 is applicable to any of the embodiments illustrated in the drawings. The relief branch could be eliminated by having a uni-directional fluid valve on the plunger itself which discharges fluid as the plunger is pushed inward.

In FIG. 5 there is illustrated a metering device 180 which utilizes a flexible diaphragm or membrane 182 as a fluid pressure transmitting means, so that the fluid 56 which is contained in the system will not contact the fluid 184 which is used in the cylindrical member 186 within which the plunger 188 reciprocates. Thus, the fluid 184 may be some suitable oil or the like which helps maintain a seal, or the fluid of the body 56 may be some corrosive or solvent or volatile fluid which it is not desired to have in contact with the plunger 188 or open to the atmosphere at this point.

The vessel 38 has a fitting 190 secured thereto by suitable means comprising the springs and hook members of FIG. 1, and said fitting has a lateral vacuum branch 192 with stopcock 194 for which there may be substituted the structure 170 and 172 of FIG. 3 (if means are provided to push the plunger 188 down). The cylindrical member 186 is secured in a port 196 with the membrane 182 seized between the end of the member 196 and the port mouth much like a gasket.

In this embodiment, by way of variation, the plunger 188 is secured to a flexible member 200 which rides over a sheave 202 carried on a wheel 204 having a projection 206 adapted to engage the buttons of the start and stop switches 98 and 100. The member 200 is secured to a drum 208 provided on an electric motor 210 which may drive the drum through a suitable clutch.

When the plunger 188 is raised by the motor 210, it will move to the dotted line position shown in the upper end of the tubular member 186, causing collapse of the membrane 182, which in turn will commence to draw fluid through the aperture (not shown). The electrodes 58 and 60 in the respective vessels 34 and 38 are of course connected to the input of the detector in the manner previously described.

In FIG. 7 there is illustrated a metering device 220 which is not greatly different from the device 140 in principle. In this case, the tubular member 74 has two pairs of metallic electrodes disposed along its length. These may be simple foil members adhered to the glass. The right hand pair 222 and 224 are connected to the oscillator 160 and the left hand pair 226 and 228 are connected to the oscillator 164. As seen, these electrodes are of arcuate configuration, and their capacitance is controlled by the dielectric conditions between the electrodes. The plunger 230 may be a solid metallic disc or may have a metallic foil loop disposed just below the resilient outer surface. It may have a sealing disc coaxial and parallel therewith so that the metallic periphery does not contact and frictionally engage the interior of the tubular member 74 or it may have any of a number of other different structures. The principal purpose for the metallic member on the plunger 230 is to provide a substantial change in the capacitance represented by the pairs of arcuate electrodes when said plunger is aligned therewith. Such a change may increase the capacitive coupling between two parts of the oscillator circuit or may vary the frequency of the tank circuit, so that there is a change in the output of the oscillator which may be translated by start or stop means 162 and 166 into an energization or de-energization of the input circuit of the detector 10. A single plunger 230 is shown, but it is feasible to use a double arrangement as in FIG. 3 to decrease the distance of travel and hence the metering interval. Adjustment of the electrodes along the length of the tubular member 74 adjusts the metered volume and the metering interval.

In FIG. 6 there is illsutrated a simplified form 240 of the invention in which a very small volume of fluid may be metered. The entrance of the tubular member 74 is closed off by means of a plug 242 which is of some resilient rubber-like material or any suitable sealing structure. For example, a soft resilient washer may be clamped between suitable metallic washers to compress the said soft washer. Stop means 244 prevent the plug 242 from moving into the interior of the tubular member 74. Instead of a plunger, a relatively fine wire or rod 246 is reciprocable into the body of fluid 248 which connects with the scanning vessels. The movement of this wire or rod displaces fluid which is equal to the volume of the rod and hence enables the application of pressure or suction, depending upon the movement, which will enable very fine and accurate metering of the fluid. The rod 246 may be conductive and arranged to close various circuits for starting and stopping the operation of the detector 10. For example, there is a wiper 250 which is grounded in continuous contact with the rod 246 and as the rod moves downwardly, it may first engage the contact 252 to complete a first circuit, after which it engages a second contact 254 to complete a second circuit.

The metering device 240 operates in the system in the manners described in connection with the other embodiments of the invention.

The metering device of the invention described herein may be driven by the change in volume of the fluid with which the plunger is in communication during the metering interval and still provide the desired results. Thus, for example, in the structures shown, suction of pressure may be applied to one or the other of the bodies of fluid 36 and 56 to cause movement of the fluid through orifice 42 and the plunger may be a passive member, as it were. Under such circumstances, plunger will follow the change in volume and operate the detector counter circuit switches, if desired.

From the above discussion it will be apparent that the invention herein has a scope which is substantially greater than that which might be inferred from the embodiments illustrated and described. Considerable variation in the structure is readily capable of being made without departing from the spirit of the invention, and hence it is desired only to be limited by the claims as hereinafter set forth, interpreted in the light of the broadest equivalents to which we are entitled in view of the prior art.

What it is desired to secure by Letters Patent is:

1. In a fluid study apparatus which includes a closed vessel having a first body of fluid therein and an aperture submerged in a second body of fluid and fluid from said second body adapted to pass through said aperture to said first body; means for metering said fluid comprising a reciprocable member of predetermined shape in fluid pressure communication with said first body, means for moving said reciprocable member to create a pressure differential between the first and second bodies of fluid to cause said flow, and means for relating the stroke of said reciprocable member to a predetermined volume of fluid drawn through said aperture.

2. A structure as claimed in claim 1 in which said reciprocable member comprises a plunger biased to move in a direction to change the internal volume of said closed vessel.

3. A particle studying device which includes a pair of vessels having an orifice therebetween and a separate body of fluid in each vessel with one body of fluid including particles therein, a circuit established between said vessels through said orifice and including a detector therein adapted to indicate an electrical change when a particle from said one body passes through said orifice to said second body, means for drawing fluid from said first body through said orifice which comprises a reciprocable member of predetermined shape in fluid pressure engagement with said second body of fluid and arranged to move in a direction for increasing the volume of said second body of fluid, and means for activating and deactivating said detector during a predetermined portion of the stroke of said reciprocable member, whereby said detector will be operating only for a period of flow represented by the displacement of the reciprocable member during said predetermined portion of said stroke.

4. A device as claimed in claim 3 in which there is a tubular member communicating with the vessel which contains said second body and said reciprocable member is movable in said tubular member and has means biasing same to move outwardly of said vessel.

5. A device as claimed in claim 3 in which said vessel having said second body of fluid has a branch comprising a tubular portion and said reciprocable member is disposed in said tubular portion in sealed slidable engagement therewith, and there is a third body of fluid in said tubular portion, with an impervious flexible fluid pressure transmitting membrane between said second and third bodies.

6. A device as claimed in claim 3 in which said vessel having said second body of fluid therein has means connected therewith for applying a vacuum to said vessel for providing an initial movement of said reciprocable member in a direction decreasing the volume of said second body, and said reciprocable member being biased to move in an opposite direction.

7. A device as claimed in claim 3 in which said vessel having said second body of fluid therein has means connected therewith for applying a vacuum to said vessel for providing an initial movement of said reciprocable member in a direction decreasing the volume of said second body, and said reciprocable member being biased to move in an opposite direction, said activating and deactivating means including electrical switch apparatus and means are mechanically connected with said reciprocable member for operating said switch apparatus in a predetermined order at the beginning and end of said predetermined portion of said stroke.

8. A device as claimed in claim 3 in which said vessel having said second body of fluid therein has a discharge branch therein, and said reciprocable member is adapted to be initially moved in a direction tending to decrease the volume of said second body of fluid whereby to cause discharge of fluid from said discharge branch, whereby thereafter movement of said reciprocable member in an opposite direction will apply vacuum to said second body of fluid.

9. In a structure of the character described and including a pair of vessels having an orifice between them and a first body of fluid in one vessel and a second body of fluid in the second vessel, the first vessel being closed and the orifice submerged joining both bodies, means for metering fluid flowing between vessels through said orifice comprising a fluid displaceable member of predetermined shape in fluid pressure engagement with said first body and movable relative said first vessel with change of the effective volume thereof, movement of said member being related to the volumetric flow of fluid through said orifice.

10. A structure as claimed in claim 9 in which means are provided to apply a differential pressure between the first and second bodies of fluid to cause said flow and the change of volume of said first body of fluid causes movement of said fluid displaceable member.

11. In a structure of the character described and including a pair of vessels having an orifice between them and a body of fluid in each vessel with one vessel being completely enclosed and filled with fluid, a metering device for moving fluid through said orifice and comprising a branch of said one vessel having a reciprocable member of predetermined shape therein sealed to slide in said branch with one side in fluid pressure communication with said body of fluid in said one vessel and open to the atmosphere, whereby the displacement of said reciprocable member represents an equivalent volume of fluid passing through said orifice.

12. A structure as claimed in claim 11 in which said branch is closed off with a plug and said reciprocable member comprises an elongate rod slidable in said plug having its inside end in communication with said body of fluid in said one vessel, and its external end exposed to the atmosphere.

13. A structure as claimed in claim 11 in which elongate means are secured to said reciprocable member and extending outside of said branch and means are provided biasing said reciprocable member to be moved relative to said branch.

14. A structure of the character described which comprises metering means for a fluid flow device and adapted to have a pair of control circuits operated by movement of a reciprocating member between two positions, said reciprocating member having a pair of coupling elements spaced along the axis of movement thereof, and each control circuit including a pair of coupled elements also spaced along the axis of movement of the reciprocating member and adapted to have their condition of coupling changed when either of said coupling elements is in proximity therewith, the pairs of opposed coupled elements being spaced further apart than the pair of coupling elements.

15. In combination, a first body of fluid contained in a first vessel and substantially filling said vessel, a second body of fluid, a passageway between said bodies of fluid whereby a fluid differential pressure will cause flow of fluid from said second to said first bodies, means scanning the fluid as same passes through said passageway, said closed vessel having a tubular extension open at one end but having a reciprocable member of predetermined shape therein blocking same off, with the reciprocable member having its inner face in fluid pressure communication with the said first body of fluid, means connected with said first body of fluid enabling inward movement of said reciprocable member to position the same for a reverse stroke tending to increase the total volume of said closed vessel, means causing said reverse stroke, and means associated with said reciprocable member for activating said scanning means during a predetermined portion of said reverse stroke.

16. A structure as claimed in claim 15 in which said means for enabling inward movement comprises a source of vacuum connected with said first vessel, and controllable to automatically cause said inward movement.

17. A structure as claimed in claim 15 in which said means for enabling inward movement comprises a discharge branch having valve means therein which can be opened to discharge a portion of said first body of fluid while said reciprocable member is moved inward.

References Cited in the file of this patent

UNITED STATES PATENTS

| | | |
|---|---|---|
| 2,498,672 | Glass | Feb. 28, 1950 |
| 2,869,078 | Coulter | Jan. 13, 1959 |